April 18, 1967  L. A. URBAN  3,314,233
FUEL CONTROL
Filed Jan. 15, 1964  3 Sheets-Sheet 1
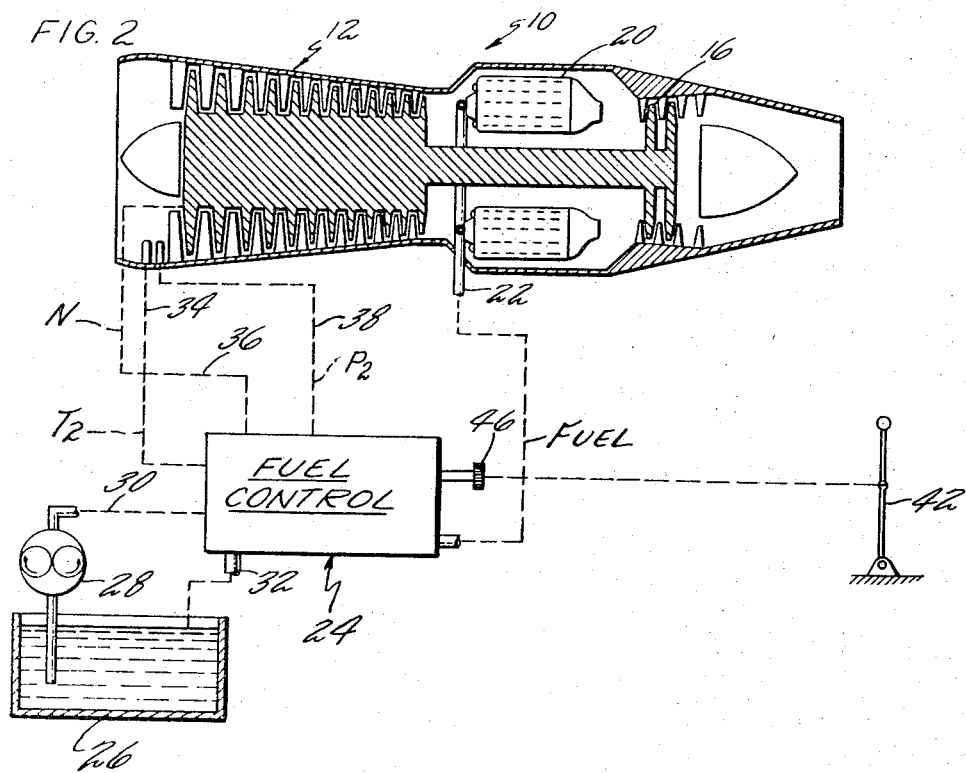
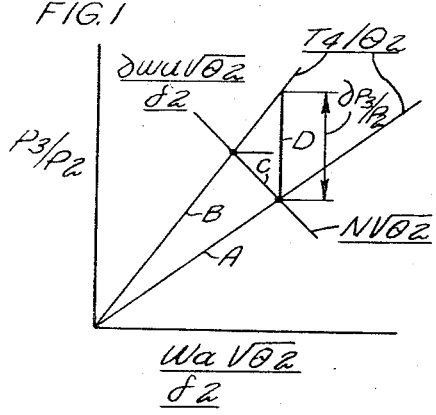
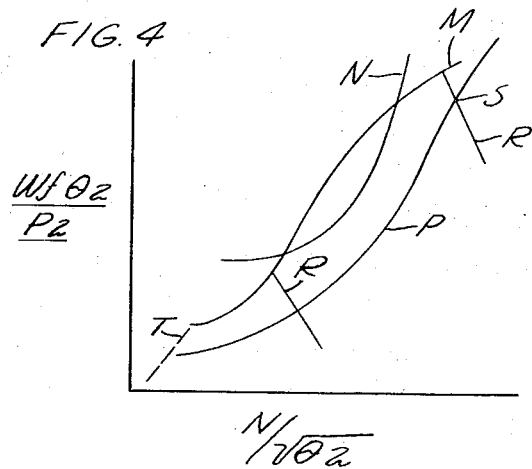
INVENTOR
LOUIS A. URBAN
BY Norman Friedland
ATTORNEY

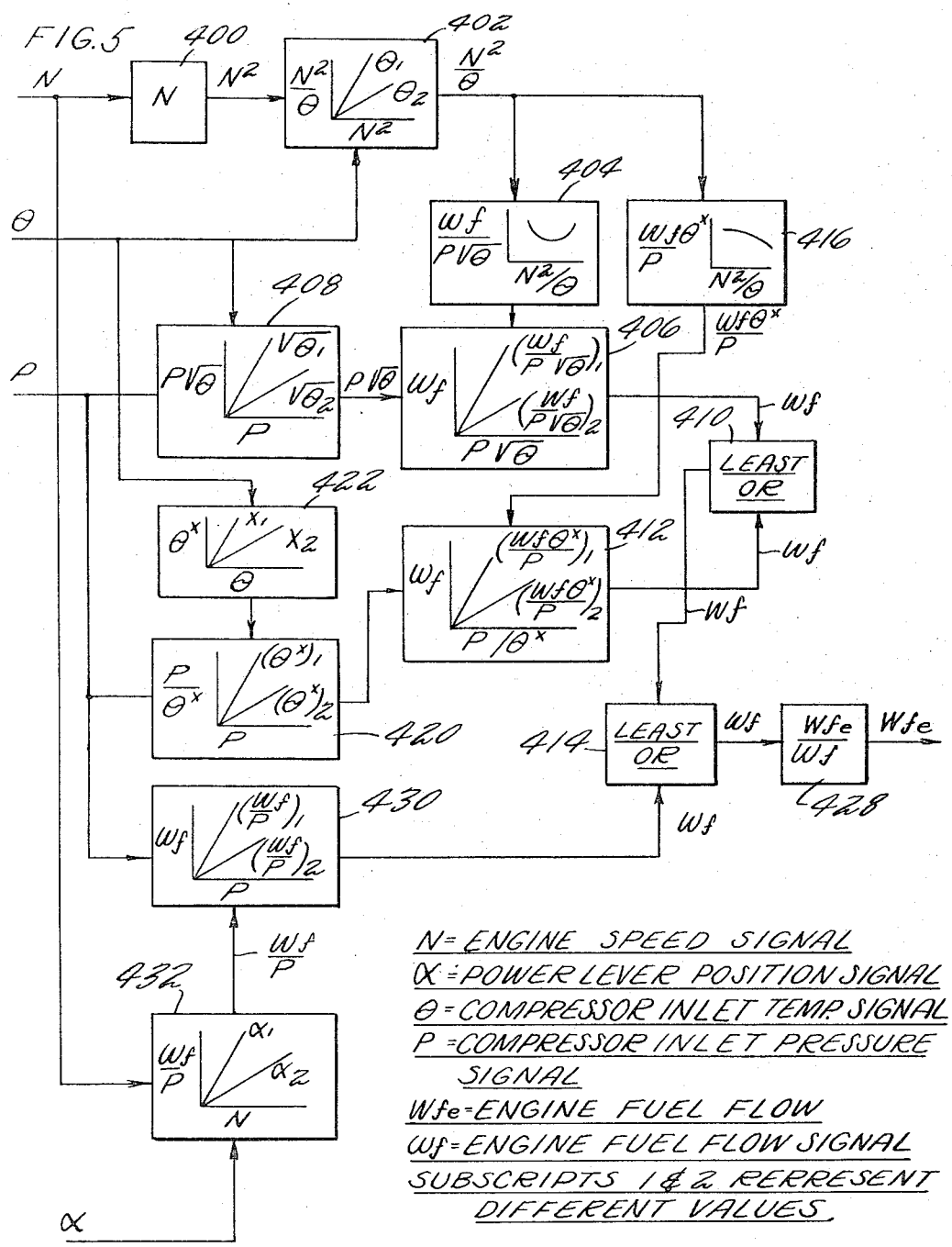

United States Patent Office 3,314,233
Patented Apr. 18, 1967

---

3,314,233
FUEL CONTROL
Louis A. Urban, Granby, Conn., assignor to United Aircraft Corporation, East Hartford, Conn., a corporation of Delaware
Filed Jan. 15, 1964, Ser. No. 337,906
8 Claims. (Cl. 60—39.28)

This invention relates to fuel controls and more particularly to fuel controls for controlling turbine types of power plants.

As is generally well known in the art, the fuel control is a combination of metering devices and computing mechanism serving to control the flow of fuel to the engine in an amount commensurate with efficient and optimum engine operation, yet assuring that a malfunction due to surge, rich or lean flame out and overtemperature does not ensue. Overtemperature in this instance means that temperature which will adversely affect the components of the engine.

Basically, the metering system of the fuel control selects the rate of fuel flow to be supplied to the engine burners in accordance with the amount of thrust (for pure jet) or horsepower (for turboprops and jets driving a variable load such as the rotor blades of a helicopter) demanded by the pilot, but subject to engine operating limitations as scheduled by the computing system as a result of its monitoring various engine operational parameters. As is realized, the computing system of the fuel control senses and combines the various parameters to control the output of the metering section during all regimes of engine operation.

In certain heretofore known fuel controls for turbine power plants, engine scheduling is accomplished by relating all the operational parameters being monitored by the fuel control in terms of scheduled ratio of $W_f/P_2$, where $W_f$ is fuel flow in pounds per hour, $P_2$ is absolute compressor inlet pressure. It is important to understand here that this ratio of $W_f/P_2$ is a value "built" into the fuel control by virtue of cams, linkages, levers and the like which value represents the desired engine operation. Hence, the ratio $W_f/P_2$ may be considered to be a scheduled value, which for any given speed (r.p.m.) of the engine's rotor (compressor and/or turbine) defines all the operations of the engine.

In these heretofore fuel controls utilizing the $W_f/P_2$ control parameter, the computing mechanism computes the various monitored engine operation parameters and converts these parameters in terms of this $W_f/P_2$ ratio. The fuel control also senses the actual compressor inlet pressure and feeds this signal to the multiplying mechanism of the computing system which also receives the $W_f/P_2$ ratio signal. Here these two signals are multiplied for obtaining the product "$W_f$" of the two. This "$W_f$" signal is then transmitted to the fuel metering devices for metering devices in their full flow position. Owing to the thrust or horsepower. Basically, such a system describes the control philosophy for both acceleration and steady state engine operation.

As is known in this art, the highest obtainable rate of acceleration is always desirable in turbine types of power plants, and obviously, this is accomplished by placing the metering devices in their full flow position. Owing to the fact that the component parts of the engine can only tolerate a certain maximum temperature and that the compressor is subject to surge (a pressure pulsating condition that occurs at any particular given speed, at a given pressure ratio or given weight flow of the compressor) the computing system must assure that these conditions as well as rich and lean flame out do not ensue. These regimes of operation are computed by the fuel control computing system which senses and combines various engine operating parameters.

The heretofore systems utilize a three-dimensional cam for computing the fuel rate necessary to avoid the maximum temperature and surge. The three-dimensional cam is best described as a cam having movement in an axial and rotational direction in response to selected engine operation conditions and operates to give the temperature and surge limits. As mentioned above, the fuel control computing system must compute the value of the preselected engine operational parameters in terms of $W_f/P_2$ ratio so that it will be compatible with the multiplication system. The three-dimensional cam serves this purpose for acceleration scheduling. This is accomplished by having the cam move in one direction in response to compressor speed and having it move in another direction in response to compressor inlet temperature. The cam follower responding to the radius of the cam develops a signal whose value corresponds to the desired $W_f/P_2$ value.

The cam's profile comprises a plurality of curves superimposed thereon defining the engine's operational characteristics in terms of $W_f/P_2$ as a function of inlet temperature of the compressor and compressor speed. To more fully appreciate the present invention, it is worthy to note that the engine's surge and temperature characteristics can be defined for all engine operations in terms of $W_f/P_2$ vs. engine speed. In such a plot it will be appreciated that both surge and temperature form a family of curves where each curve of the family depends on the value of the compressor inlet temperature. As is obvious to one skilled in this art the turbine inlet temperature for any given speed of the compressor and value of $W_f/P_2$ varies as a function of compressor inlet temperature.

As is well known by those familiar with the heretofore known fuel controls, surge and temperature limits are each represented by a family of curves for the overall engine operation. It is also well known that the conventional three-dimensional cam was the only known practical device capable of defining a schedule representing two separate families of curves varying as a function of two independent input signals. Owing to this fact, it has been the heretofore practice to utilize a three-dimensional cam in these heretofore known fuel controls.

It is a purpose of this invention to completely eliminate the three-dimensional cam yet obtain accurate acceleration limit scheduling mechanism. We have found that this is made possible by utilizing $$\frac{W_f \theta_2^x}{P_2}$$

versus $N^2/\theta_2$ or $$\frac{N}{\sqrt{\theta_2}}$$

as the control parameters instead of the heretofore known $W_f/P_2$ versus $N$ control parameters; where $N$=the r.p.m. of engine rotating mechanism; $\theta_2$=temperature of the air entering the compressor and $x$=an exponential value.

By utilizing the $$\frac{W_f \theta_2^x}{P_2} \text{ vs. } \frac{N^2}{\theta_2}$$

as the control parameters, the maximum temperature limit schedule and surge limit schedule can each be represented by a single function of the parameters. This is a complete departure from the heretofore known fuel control philosophy since as was described above, the family of curves representing surge and temperature become nonexisting. Owing to this fact the need of a three-dimensional cam is completely eliminated.

It will be appreciated that the elimination of the three-dimensional cam is a major break-through in this art not only because it eliminates a costly item, but also because it allows independent and separate scheduling of the temperature and surge of the acceleration schedule. Hence, adjustment of either the surge or temperature limit schedule can be accomplished independently.

Other features and advantages will be apparent from the specification and claims and from the accompanying drawings which illustrate an embodiment of the invention.

FIG. 1 is a graphical illustration used to facilitate the derivation of the control parameter.

FIG. 2 is a schematic illustration showing a fuel control connected to a free-turbine type of gas turbine engine.

FIG. 4 is a graphical illustration representing the operational characteristics of a fuel control made in accordance with this invention.

FIG. 5 is a block diagram illustrating the invention.

Figure 3:
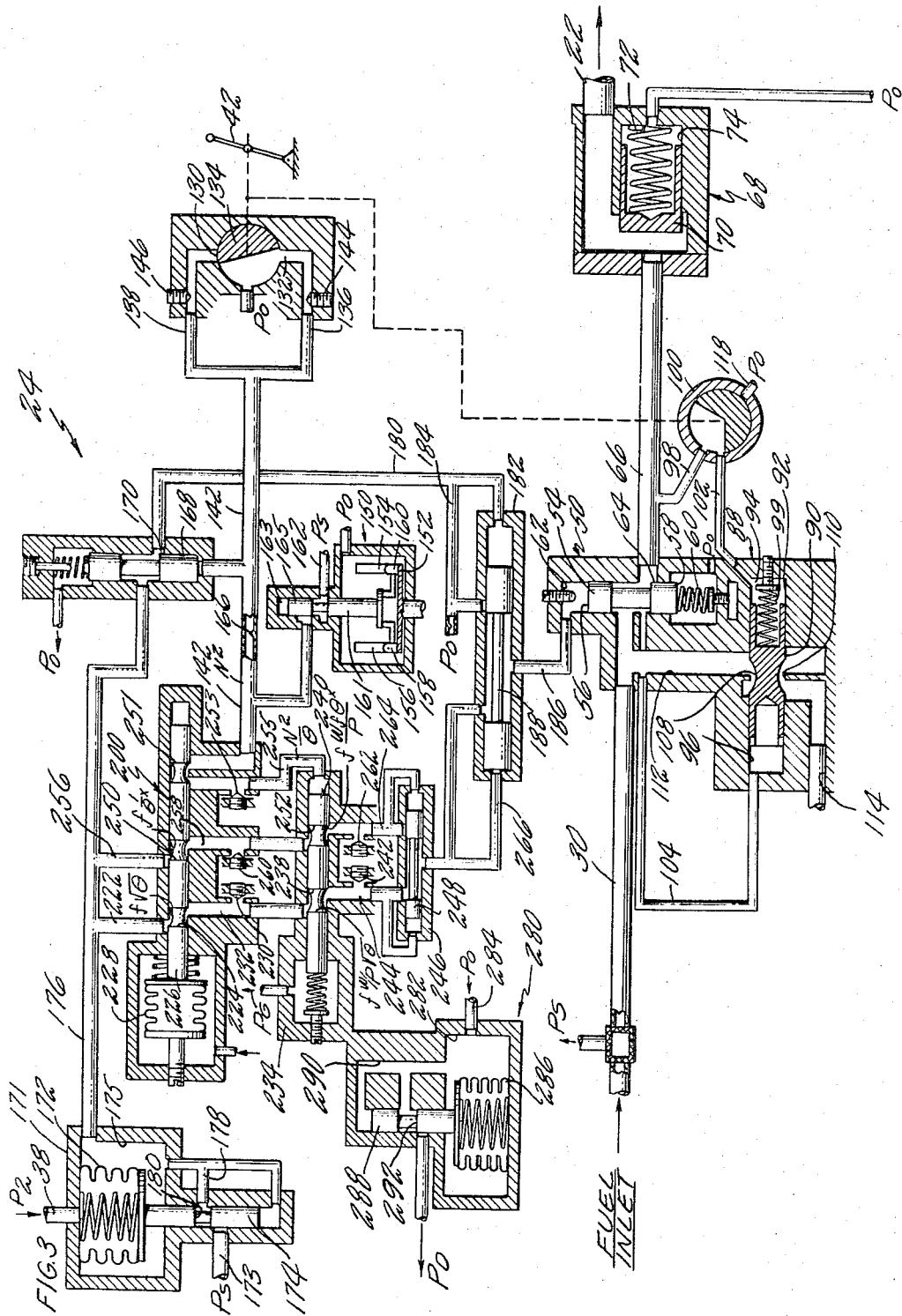
FIG. 3 is a schematic illustration of a fuel control mechanism utilizing this invention.

In order to appreciate this invention it is necessary to understand that the maximum temperature limit schedule of a gas turbine engine can be represented by a single function of the parameters $$\frac{W_f \theta_2^x}{P_2}$$

and $$\frac{N}{\sqrt{\theta_2}}$$

and that the surge limit schedule can be represented by a single function of the parameters $$\frac{W_f}{P_2 \sqrt{\theta_2}}$$

and $$\frac{N}{\sqrt{\theta_2}}$$

Thus, the problem solved by this invention is to modify the $W_f/P_2$ parameter which changes with varying compressor inlet temperature to obtain constant turbine inlet temperature at any given correct speed, i.e.

$$\frac{N}{\sqrt{\theta_2}}$$

It is within the scope of this invention in the terms (parameters) are computed in static or total values.

The following mathematical derivation shows how the engine characteristics have been computed to show that a single line function of $$\frac{W_f \theta_2^x}{P_2}$$

versus corrected engine speed will hold actual turbine inlet temperature at a constant value for any value of engine inlet temperature. Small second order effects have been ignored in the derivation.

The following notations will be used for deriving the parameter $$\frac{W_f \theta_2^x}{P_2}$$

$\dfrac{N}{\sqrt{\theta_2}}$ = corrected engine speed in revolutions per minute $\dfrac{W_a \sqrt{\theta_2}}{\delta_2}$ = Corrected Engine airflow in pounds/second $\Gamma_4$ = Turbine inlet flow number $\dfrac{P_3}{P_2}$ = Compressor pressure ratio $\eta_c$ = Compressor efficiency $\dfrac{T_3}{\theta_2}$ = Corrected Compressor outlet temperature in degrees (2) Rankine $\dfrac{\Delta T_b}{\theta_2}$ = Corrected Burner temperature rise in degree (°) Rankine $\dfrac{W_f}{\delta_2 \sqrt{\theta_2}}$ = Engine fuel flow in pounds/hour $\eta_b$ = Combustion efficiency $\dfrac{T_4}{\theta_2}$ = Corrected Turbine inlet temperature in degrees (°) Rankine $q_f$ = Fuel heating value in $\dfrac{\text{British thermal units}}{\text{pound}}$ $C_p$ = Specific heat at constant pressure in $\dfrac{\text{British thermal units}}{\text{pound (°) Rankine}}$ $K$ = Ratio of specific heats $\dfrac{C_p}{C_v}$ $\theta_2 = \dfrac{T_2}{T_0} = \dfrac{T_2}{518.4° R.}$ $\delta_2 = \dfrac{P_2}{P_0} = \dfrac{P_2}{14.7 \text{ p.s.i.a.}}$ $\partial$ = Sign for derivative $W_g = W_a + W_f$ = Weight of gas = Weight of air + weight of full $\phi$ = Constant The subscripts listed below indicate the location within the engine unless indicated otherwise:
where
2 is at the inlet of the compressor
3 is at the outlet of the compressor
4 is at the inlet of the turbine
5 is at the discharge of the turbine
6 is at the tailpipe
b is at the burner To satisfy the requirement stated immediately above, first it is necessary to find the interrelationship that exists between the corrected ratio unit $$\frac{W_f}{P_2 \sqrt{\theta_2}}$$

and corrected turbine inlet temperature $T_4/\theta_2$ at any particular corrected engine speed $$\frac{N}{\sqrt{\theta_2}}$$

Turbine inlet air flow is commonly expressed as a flow number $\Gamma_4$, where (1) $$\Gamma_4 = \frac{W_g \sqrt{T_4}}{A_4 P_4}$$

Using the calculus this may be differentiated to the form (2) $$\frac{\partial \Gamma_4}{\Gamma_4} = \frac{\partial W_g}{W_g} + \frac{1}{2} \frac{\partial T_4}{T_4} - \frac{\partial P_4}{P_4} - \frac{\partial A_4}{A_4}$$

Recognizing that the turbine inlet area is of fixed geometry, and ignoring minor second order effects, this may be re-expressed as (3) $$\frac{\partial P_3}{P_3} = \frac{\partial W_a}{W_a} + \frac{1}{2} \frac{\partial T_4}{T_4} - \frac{\partial \Gamma_4}{\Gamma_4}$$

The general expression for fuel flow in terms of other parameters within the engine is (4) $$W_f = \frac{W_a C_p \Delta T_b 3600}{\eta_b q_f}$$

Using the calculus and ignoring minor second order terms, this may be differentiated to the form (5) $$\frac{\partial W_f}{W_f} = \frac{\partial W_a}{W_a} + \frac{\partial \Delta T_b}{\Delta T_b}$$

The burner temperature rise is simply (6) $$\Delta T_b = T_4 - T_3$$

The rate of change of burner temperature rise is then (7) $$\frac{\partial \Delta T_b}{\Delta T_b} = \frac{T_4}{\Delta T_b}\frac{\partial T_4}{T_4} - \frac{T_3}{\Delta T_b}\frac{\partial T_3}{T_3}$$

For an adiabatic compression as occurs in a gas turbine engine compressor, the compressor temperature ratio is approximately (8) $$\frac{T_3}{T_2} = \left(\frac{P_3}{P_2}\right)^{\frac{K-1}{K\eta_c}}$$

This may be differentiated to the form (9) $$\frac{\partial T_3}{T_3} = \frac{K-1}{K\eta_c}\frac{\partial P_3}{P_3}$$

Equations 7 and 9 may be combined to the form

(10) $$\frac{\partial \Delta T_b}{\Delta T_b} = \frac{T_4}{\Delta T_b}\frac{\partial T_4}{T_4} - \frac{T_3}{\Delta T_b}\frac{K-1}{K\eta_c}\frac{\partial P_3}{P_3}$$

Equations 10 and 5 may be combined to the form

(11) $$\frac{\partial W_f}{W_f} = \frac{\partial W_a}{W_a} + \frac{T_4}{\Delta T_b}\frac{\partial T_4}{T_4} - \frac{T_3}{\Delta T_b}\frac{K-1}{K\eta_c}\frac{\partial P_3}{P_3}$$

Combining Equations 11 and 3 and collecting similar terms

(12) $$\frac{\partial W_f}{W_f} = \left[1 - \frac{T_3}{\Delta T_b}\frac{K-1}{K\eta_c}\right]\frac{\partial W_a}{W_a} + \left[\frac{T_4}{\Delta T_b} - \frac{T_3}{\Delta T_b}\frac{K-1}{2K\eta_c}\right]\frac{\partial T_4}{T_4} + \frac{T_3}{\Delta T_b}\frac{K-1}{K\eta_c}\frac{\partial T_4}{T_4}$$

Equation 12 then is a general expression for the rate of change of fuel flow in terms of the rates of change of the turbine inlet flow number, turbine inlet temperature and engine inlet air flow. At any constant corrected engine speed (which is a condition of the original problem statement) there is very little, if any, variation of turbine inlet flow number due to changes in any other thermodynamic parameter, especially when the turbine nozzles are choked, as they are in most engines over the greatest part of their useful operating spectrum. Equation 12 may therefore be simplified to

(13) $$\frac{\partial W_f}{W_f} = \left[1 - \frac{T_3}{\Delta T_b}\frac{K-1}{K\eta_c}\right]\frac{\partial W_a}{W_a} + \left[\frac{T_4}{\Delta T_b} - \frac{T_3}{\Delta T_b}\frac{K-1}{2K\eta_c}\right]\frac{\partial T_4}{T_4}$$

To get the desired expression for the rate of change of fuel flow in terms of the rate of change of turbine inlet temperature, it is necessary to establish the relationship between the rates of change of air flow and turbine inlet temperature at constant corrected speed. In the art, compressor performance is commonly depicted in a graphical chart form called a "compressor map" or "compressor characteristic." FIG. 1 will be recognized as a portion of such a compressor map, showing a portion of a single corrected speed line and two turbine inlet temperature lines, A and B. Value C is the change in engine air flow which will occur when going from turbine inlet temperature value A to value B at constant engine speed. Value D is the change which would occur in compressor pressure ratio going from turbine inlet temperature value A to value B at constant engine air flow. Obviously then

(14) $$\partial P_3\Big|_{W_a=\phi} = \frac{\partial P_3}{\partial W_a}\Big|_{T_4=\phi}\partial W_a + \frac{\partial P_3}{\partial W_a}\Big|_{N=\phi}\partial W_a$$

Equation 14 may be rewritten to the form

(15) $$\partial W_a = \frac{\partial P_3\big|_{W_a=\phi}}{\frac{\partial P_3}{\partial W_a}\big|_{T_4=\phi} + \frac{\partial P_3}{\partial W_a}\big|_{N=\phi}}$$

Expressed as percentage rates of change

(16) $$\frac{\partial W_a}{W_a} = \frac{\frac{\partial P_3}{P_3}\big|_{W_a=\phi}}{\frac{\partial P_3}{P_3}\Big/\frac{\partial W_a}{W_a}\big|_{T_4=\phi} + \frac{\partial P_3}{P_3}\Big/\frac{\partial W_a}{W_a}\big|_{N=\phi}}$$

From Equation 3 and the problem statement it is obvious that

(17) $$\frac{\partial P_3}{P_3}\Big|_{W_a=\phi} = \frac{1}{2}\frac{\partial T_4}{T_4}$$

and that

(18) $$\frac{\frac{\partial P_3}{P_3}}{\frac{\partial W_a}{W_a}}\Bigg|_{T_4=\phi} = 1$$

also

(19) $$\frac{\frac{\partial P_3}{P_3}}{\frac{\partial W_a}{W_a}}\Bigg|_{N=\phi} = \frac{1}{\frac{\partial W_a}{W_a}\Big/\frac{\partial P_3}{P_3}\Big|_{N=\phi}}$$

Where $$\frac{\frac{\partial W_a}{W_a}}{\frac{\partial P_3}{P_3}}\Bigg|_{N=\phi}$$

is the reciprocal of the absolute value of the slope of the compressor map speed line.

Using Equations 17, 18 and 19, Equation 16 may then be expressed as

(20) $$\frac{\frac{1}{2}\frac{\partial T_4}{T_4}}{1 + \frac{\frac{\partial W_a}{W_a}}{\frac{\partial P_3}{P_3}}\big|_{N=\phi}} = \frac{\partial W_a}{W_a}$$

Combining Equations 20 and 13 and collecting terms,

(21) $$\frac{\partial W_f}{W_f} = \left[\frac{T_4}{\Delta T_b} - \frac{T_3}{\Delta T_b}\frac{K-1}{2K\eta_c}\left(\frac{1}{\frac{\partial W_a}{W_a}\Big/\frac{\partial P_3}{P_4}} + 1\right) - \frac{\frac{\partial W_a}{W_a}\Big/\frac{\partial P_3}{P_3}}{2\left(1 + \frac{\partial W_a}{W_a}\Big/\frac{\partial P_3}{P_3}\right)}\right]\frac{\partial T_4}{T_4}$$

Using the corrected quantity equivalents of the parameters, Equation 21 may be expressed as

(22)
$$\frac{\frac{\partial W_f}{P_2}\sqrt{\theta_3}}{\frac{W_f}{P_2}\sqrt{\theta_2}} = \left[\frac{\frac{T_4}{\theta_2}}{\frac{\Delta T_b}{\theta_2}} - \frac{\frac{T_3}{\theta_2}}{\frac{\Delta T_b}{\theta_2}}\frac{K-1}{2K\eta_c}\left(\frac{1}{\frac{\partial W_a}{W_a}+1}\right) - \frac{\frac{\partial W_a}{W_a}}{\frac{\partial P_3}{P_3}}\right]\frac{\partial \frac{T_4}{\theta_2}}{\frac{T_4}{\theta_2}}$$

Equation 22 then expresses the interrelationship that exists between the corrected ratio unit $$\frac{W_f}{P_2\sqrt{\theta_2}}$$

and corrected turbine inlet temperature $T_4/\theta_2$ at any particular corrected engine speed $$\frac{N}{\sqrt{\theta_2}}$$

with minor second order terms being ignored.

The differential form, Equation 22 may now be expanded to

(23)
$$\frac{\frac{\partial W_f}{P_2}}{\frac{W_f}{P_2}} - \frac{1}{2}\frac{\partial \theta_2}{\theta_2} = \left[\frac{\frac{T_4}{\theta_2}}{\frac{\Delta T_b}{\theta_2}} - \frac{\frac{T_3}{\theta_2}}{\frac{\Delta T_b}{\theta_2}}\frac{K-1}{2K\eta_c}\left(\frac{1}{\frac{\partial W_a}{W_a}+1}\right) - \frac{\frac{\partial W_a}{W_a}}{\frac{\partial P_3}{P_3}}\right]\cdot\left[\frac{\partial T_4}{T_4} - \frac{\partial \theta_2}{\theta_2}\right]$$

Since the desire is to find a single value function of $W_f/P_2$ and $\theta_2$ which will hold actual $T_4$ constant regardless of the value of $\theta_2$, $\delta T_4/T_4$ must equal zero. Recognizing this, collecting terms and simplifying

(24)
$$\frac{\frac{\partial W_f}{P_2}}{\frac{W_f}{P_2}} + \left[\frac{T_4}{\Delta T_b} - \frac{T_3}{\Delta T_b}\frac{K-1}{2K\eta_c}\left(\frac{1}{\frac{\partial W_a}{W_a}+1}\right) - \frac{\frac{\partial W_a}{W_a}}{\frac{\partial P_3}{P_3}} + 1/2\right]\frac{\partial \theta_2}{\theta_2} = 0$$

Letting the coefficient between the brackets be represented by the arbitrary symbol $x$ and using the calculus to integrate Equation 24

(25)
$$\frac{W_f\theta_2{}^x}{P_2} = \text{constant}$$

That is to say, if at any particular value of corrected engine speed a constant value of $$\frac{W_f\theta_2{}^x}{P_2}$$

is scheduled to the engine, then actual turbine inlet temperature will not vary regardless of the value of engine inlet temperature ratio $\theta_2$. The actual value of ratio units scheduled to the engine will be

(26)
$$\frac{W_f}{P_2} = \frac{W_f\theta_2{}^x}{P_2}\cdot\frac{1}{\theta_2{}^x}$$

As can be seen from Equation 24 the $x$ exponent contains terms related to burner temperature rise, compressor discharge temperature, compressor efficiency, and the slope of the compressor characteristic curves, all of which vary with corrected engine speed for any particular turbine inlet temperature. For many engines it would be sufficiently precise to let $x$ be a constant irrespective of corrected engine speed; for others it would not, and $x$ itself must also be varied with corrected engine speed, as is $$\frac{W_f\theta_2{}^x}{P_2}$$

A more generic derivation of the exponential term is given in the formulas below:

(1) $\quad Y\theta^\alpha = f\left(\frac{T_4}{\theta_2}\right)$ at constant arrested speed where $Y\theta^\alpha$ is any referred parameter in engine thermodynamics cycle, and $\alpha$ can be either a positive number, negative number, or zero (2) $$\frac{\partial Y\theta^\alpha}{Y\theta^\alpha} = \beta\frac{\frac{\partial T_4}{\theta_2}}{\frac{T_4}{\theta_2}}$$

where $\beta$ is indicative of the rate of change of $Y\theta^\alpha$ with respect to $\frac{T_4}{\theta_2}$ Expanding Equation 2

(3) $$\frac{\partial Y}{Y} + \alpha\frac{\partial \theta}{\theta} = \beta\frac{\partial T_4}{T_4} - \beta\frac{\partial \theta_2}{\theta_2}$$

if $\frac{\partial T_4}{T_4}$ is to be zero (4) $$\frac{\partial Y}{Y} + (\alpha+\beta)\frac{\partial \theta}{\theta} = 0$$

or, integrating, (5) If $Y\theta^{(\alpha+\beta)} = \text{constant}$, $T_4$ will not change at constant $$\frac{N}{\sqrt{\theta_2}}$$

i.e., $Y\theta^{(\alpha+\beta)} = f\left(\dfrac{N}{\sqrt{\theta_2}}\right)$ only to give constant $T_4$ Considering some typical parameters:

(I)  Let $Y\theta_2^\alpha = \dfrac{Wf}{P_3\sqrt{\theta_2}}$ then $Y = \dfrac{Wf}{P_3}$ $\theta_2^\alpha = \dfrac{1}{\sqrt{\theta_2}}$ $\alpha = -1/2$ and $\dfrac{W_f \theta_2^{(\beta-1/2)}}{P_3} = f\left(\dfrac{N}{\sqrt{\theta_2}}\right)$ only for constant $T_4$ (II)  Let $Y\theta_2^\alpha = \dfrac{Wf}{P_2\sqrt{\theta_2}}$ then $Y = \dfrac{W_f}{P_2}$ $\theta_2^\alpha = \dfrac{1}{\sqrt{\theta_2}}$ $\alpha = -1/2$ and $\dfrac{W_f \theta_2^{(\beta-1/2)}}{P_2} = f\left(\dfrac{N}{\sqrt{\theta_2}}\right)$ only to give constant $T_4$ (III)  Let $Y\theta_2^\alpha = \dfrac{\Delta P}{P_3}$ then $Y = \dfrac{\Delta P}{P_3}$ $\theta_2^\alpha = 1$ $\alpha = 0$ and $\dfrac{\Delta P \theta_2^\beta}{P_3} = f\left(\dfrac{N}{\sqrt{\theta_2}}\right)$ only to give constant $T_4$ Referring now to FIG. 2 showing a gas turbine engine generally illustrated by numeral 10 having a first section 12, wherein the compressor is driven by turbine section 16. Since the turbine 16 is connected to compressor 12 for driving the same, it is generally referred to as the gas generator turbine and the rotational speed thereof is hereinafter referred to as $N_g$.

Interposed between the compressor section and the turbine section is the burner section generally indicated by numeral 20. Fuel is injected into the burner section through the fuel manifold 22 which is regulated by the fuel metering section generally indicated by numeral 24 to be described hereinbelow.

Basically, the fuel metering system of the fuel control serves to meter fuel to the engine in an amount commensurate with optimum engine operations while assuring that malfunctions due to surge, overtemperature or rich or lean blow out do not ensue. Fuel is fed to fuel control 24 from reservoir 26 and the pressure thereof is increased by virtue of pump 28 through line 30. The fuel control also contains a drain manifold which discharged excessive fuel or ported fuel to drain via line 32.

The fuel control also contains a computing system which measures certain parameters, computes them in accordance with the control parameters indicated in the above for controlling the fuel metering system. For this purpose, compressor inlet temperature is sensed via line 34, compressor speed ($N_g$) is sensed via line 36, and compressor inlet pressure is sensed via line 38. It is to be understood that any suitable mechanism for sensing these various operating conditions of the engine is contemplated within the scope of this invention. Power lever 42 is suitably situated in the cabin of the aircraft and is available to the pilot for setting the speed of the gas generator in a manner to be described hereinbelow. This control lever also serves to operate various other mechanically movable parts in the fuel control, also to be described hereinbelow. Thus, lever 42 rotates gear 46 which rotates the connecting shaft.

While the fuel control showing the preferred embodiment is illustrated in connection with a simple jet type of gas turbine engine, it is to be understood that this invention has applications as will become obvious to one skilled in the art in connection with any other type of gas turbine engine.

It is also to be understood and will be obvious to one skilled in the art that the terminology of power lever is not particularly limited to the particular lever in the cockpit of the aircraft. Rather, it is intended to cover any linkage connecting the cockpit to the fuel control whether it be referred to as a "go handle," "power lever" or throttle lever or the like.

Now referring to FIG. 3 which is a schematic illustration of a fuel control designated by numeral 24 as having both a fuel metering system and a computing system. Fuel is admitted to the throttle valve generally indicated by numeral 50 via inlet or supply line 30. Throttle valve 50 comprises spool 54 having a fluid reaction end 56 and a combined pressure and a spring reaction end 58. Adjustable spring 60 acts against end 58 while fluid admitted into chamber 62 acts against end 56 and obviously the force generated by the pressure in chamber 62 and the force generated by spring 60 and the pressure acting on end 58 will determine the position of spool 54. Fuel admitted to valve 50 from line 30 is metered by the metering edge 64 on spool 54 into line 22 by way of passage 66 and minimum pressure and shutoff valve generally indicated by numeral 68.

Minimum pressure and shutoff valve 68 comprises valve member 70 urged in one direction by the spring 72. When the value of the pressure acting on the underside or the left-hand end of valve member 70 is sufficient to overcome the force exerted by spring 72 as well as the pressure in chamber 74, the valve member is unseated allowing communication between line 66 and line 22.

So that the displacement of valve 50 and metering edge 64 is directly proportional to the fuel passing therethrough, pressure regulator valve generally indicated by numeral 88 is employed. Valve 88 comprises a spool 90 mounted in cylinder 92 defining a pair of opposing chambers 94 and 96. Disposed in chamber 94 is adjustable spring 99. Fluid upstream and downstream of throttle valve 50 is admitted to chambers 94 and 96 through line 98, valve 100 and line 102 in one instance and line 104 in the other instance.

From the foregoing, it is apparent that valve member 90 is subjected to upstream and downstream pressure together with the force exerted by spring 99. This serves to position the metering portion 108 relative to orifice 110. This orifice and metering element 108 serve to bleed pressure fluid upstream of valve 50 through line 112 into line 114 and eventually back to the reservoir through line 32, bypassing the throttle valve. Thus, it is apparent that the pressure drop across throttle valve 50 is maintained at a constant value, which value is determined by the force or the strength of spring 99. In the event a deviation of the desired pressure drop is evidenced, valve element 90 will move relative to the metering edge 110 for opening or closing said valve and hence increasing or decreasing the rate of flow therethrough for regulating the pressure drop across valve 50 to hold it constant.

It will be noted that valve 100 which is connected to lever 42 and rotated thereby is normally in the open position. By rotating valve 100, fluid in line 102 is ported to drain via line 118. This decreases the pressure in chamber 94 and since the pressure acting on the other end is at a greater value, it permits the valve to move toward the right in the full open position. This bypasses the fuel around the throttle valve and directs the entire fuel back to drain. This completely starves the engine and prevents the fuel from increasing to a pressure whose value would be above the structural integrity of the components of the fuel control. Overpressurization is occasioned by virtue of the fact that if the engine windmills by virtue of the air passing over the compressor, the fuel pump driven thereby would begin to overspeed and build up the pressure in line 30.

Now that the fuel regulating system has been described, the next portion of the description will be directed to describing the computing mechanism of the fuel control.

As was mentioned above, the position of spool 54 of throttle valve 50 is positioned by the pressure of the fluid in chamber 62. This pressure is made proportional to the desired amount of fuel which will operate the engine at a scheduled value determined by the fuel computing system. The fuel computing system computes steady state and acceleration schedules as will be described hereinbelow. In accomplishing this, lever 42 is positioned in the desired position to develop the desired amount of thrust necessary to propel the aircraft for its desired operation. Referring now to lever 42 which serves to select the predetermined speed setting of the gas generator by virtue of setting the metering area defined by orifices 130 and 132 of valve 134. This serves to set a desired area which will control the pressure in lines 136 and 138 by bleeding fluid to drain. This pressure, in turn, establishes the pressure in line 142. A pair of adjustable orifices 144 and 146 disposed in lines 136 and 138 respectively, serve to provide the idle and topping $N_g$ limits by virtue of the fact that orifice 130 is closed when lever 42 is set for topping and orifice 132 is closed when lever 42 is set for idle.

From the foregoing it is apparent that valve 134 determines a porting area for establishing a pressure in line 142 which is proportional to the speed error of the gas generator compressor 12. In order to establish a signal to compare the desired speed with actual speed, speed sensor generally indicated by numeral 150 is employed and suitably connected to and driven by compressor 12 for rotating platform 152. The platform contains flyweights 154 and 156 which are pivotally connected to the upstanding members 158 and 160. The arms of the flyweights bear against an end of pilot valve 160. When the flyweights are disturbed from their vertical position resulting from the rotational movement of platform 152, they will either move inwardly or outwardly relative to the rotational axis for positioning valve 160. This, in turn, meters fluid from line 162 to line 142 upstream of fixed restriction 166 proportional to the square of the speed. It will be noted that the pressure in line 142 goes to chamber 163 via annular space 165 made at the lap fit between spool 161 and its cylinder and balances the flyweight force which nulls the valve 161 at the right pressure.

It is apparent from the foregoing that the pressure in line 142 downstream of orifice 166 is a function of the actual speed of the compressor and the desired speed generated by the position of lever 42. This value which is a speed error signal acts on the underside of valve 168 for positioning the metering edge 170.

From the drawing it will be apparent that compressor inlet pressure from line 38 is admitted internally of bellows 172. The free end of bellows 172 acts against pilot valve 174 which serves to regulate pressure in line 176 as a function of compressor inlet pressure. This is accomplished by metering fluid issuing from pressure supply line 173 through passages in spool 174 and into chamber 175 via lines 178. Spool 174 is counterbalanced by the pressure in chamber 175 acting on its underside. Spool 174 translates with respect to the opening 180 until the pressure in chamber 175 acting externally of bellows 172 balances the pressure and the spring acting internally thereof. At the point of equilibrium, the pressure in line 176 is established at the point where it is proportional to compressor inlet pressure plus a constant.

This pressure line 176 is then fed into pilot valve 168 which serves to meter it to line 181. By properly contouring metering edge 170, this pressure is then made a function of the desired fuel flow or "$W_f$" for steady state operation. The fluid metered by metering edge 170 is then fed into selector valve 182 via branch line 184 where it is admitted to chamber 62 through line 186 when spool 188 is in the righthand position.

What has just been described is the steady state operation as established by the computing mechanism of the fuel control. The next portion of the description will describe the established acceleration surge and overtemperature schedule of the computing mechanism.

As noted from FIG. 3, pressure proportional to compressor inlet pressure is admitted to temperature responsive valve generally indicated by numeral 200 through line 222. The metering edge 224 formed on spool 226 is made to vary as a function of the square root of $\theta_2$. Compressor inlet temperature admitted to act externally of bellows 228 through line 34 causes it to expand or contract for positioning spool 226 as a function of compressor inlet temperature. By virtue of positioning metering edge 224, the pressure drop across restrictor 230 which bleeds fluid from line 232 to drain is controlled and a multiplication is effectuated so that the pressure in line 232 is made proportional to compressor discharge pressure and a function of the square root of $\theta_2$. This pressure is then admitted to valve 234 which is positioned as a function of the speed $N_g^2/\theta_2$ in the manner to be described hereinbelow. Metering edge 238 of spool 240 is made to define an area which is a function of $$\frac{W_f}{P_2\sqrt{\theta_2}}$$

The combination of this area and the area established by fixed restrictor 242 serves to effect another multiplication so that the pressure in line 244 is made proportional to the desired fuel flow "$W_f$."

The pressure in line 244 is then admitted into selector valve 246 to act on the left end of spool 248 which in this instance is the desired "$W_f$" for establishing the surge limit of the schedule. The pressure acting on the right end of spool 248 is the limit in terms of "$W_f$" for the temperature limiting portion of the acceleration schedule. This is established by metering lands 250 of spool 226 and 252 of spool 240 in the manner described immediately below.

Fluid pressure proportional to compressor inlet pressure evidenced in line 176 is admitted to the metering land 250 through line 256. This metering land is made a reciprocal function of $\theta_2$ raised to the "$x$" power which "$x$" power is established according to the mathematical computations noted above. Hence, the pressure established in line 258 is a multiplication by virtue of metering edge 250 and fixed restriction 260. The area defined by metering edge 250 varies as a function of compressor inlet pressure times a function of $1/\theta_2^x$. This fluid is then admitted to valve 234 where metering edge 252 in conjunction with fixed restriction 262 serves to effect another multiplication. Since the area defined by metering edge 252 is a function of $W_f/P_2$ times $\theta_2^x$, the pressure in line 264 is proportional to the desired fuel flow ($W_f$) for limiting temperature.

This fluid in line 264 is then admitted to selector valve 246 to act on the right-hand end of spool 248. The difference between the two values of the pressures acting on either end of spool 248 determines the position of spool 248 to either the left or right for admitting fluid into line 266. Hence, the pressure in line 266 is either the desired "$W_f$" surge or the desired "$W_f$" temperature depending on the position of selector spool 248 of selector valve 246. This pressure is then admitted to act on the left end of spool 188. As mentioned above, steady state pressure proportional to the desired fuel flow ($W_f$) acts on the right-hand end. The difference between the two values will position spool 188 to either the left or right. The pressure proportional to the desired steady state "$W_f$" or the desired surge "$W_f$" or the desired overtemperature "$W_f$" is then admitted to chamber 62 for controlling the position of spool 54 of throttle valve 50.

Since it is desirable to compute the terms of the parameters in absolute values rather than gauge pressure values, absolute pressure control 280 is employed. Fluid from the various computating valves and restrictions which is eventually ported to drain is first admitted into chamber 282 via line 284 where it acts externally of bellows 286. Bellows 286 is evacuated and has its free end operatively connected to one end of spool 288. Since the other end of spool 288 is counterbalanced by the pressure admitted thereto through line 290 metering edge 292 thereof will assume a position to establish the drain pressure for establishing an absolute value datum line. Note that the pressure level is set equal to the spring constant established in valve 17. Therefore, it will be appreciated that the datum line is equivalent to an absolute value so that the pressure control valves use a zero pressure datum rather than a gauge pressure datum.

As was pointed out in the above, the exponential "$x$" for certain engines must be varied with the corrected engine speed. Mechanism for accomplishing this could easily be added by one skilled in the art.

OPERATION

The operation of the fuel control can best be described by referring to FIG. 4 which is a graphical representation of the operation of the engine. It will be noted that the operation can be defined by the use of the control parameter derived hereinabove where $W_f/P_2 \cdot \theta_2^x$ is ordinate, and $N^2/\theta_2$ the abscissa, which is a rewritten expression for $$\frac{N}{\sqrt{\theta_2}}$$

Curve M represents the temperature limit and curve N represents the surge limit of the acceleration schedule. Curve P represents the steady state engine operation and the plurality of curves R represents an infinite number of droop lines. Assuming that it is desirable to operate the engine at the speed indicated by numeral S which intersects the steady state line and the droop line and that the engine is just put in the on position. The pilot will cause lever 42 to rotate for establishing this condition which will automatically be achieved by the computing mechanism of the fuel control.

Immediately, fuel through line 30 will be fed to the minimum pressure and shutoff valve 68 and when its value overcomes the closing force thereof it will be injected into line 22 from where it is delivered to the burners. Simultaneously a signal generated by the steady state control mechanism will cause the valve 50 to move towards wide open position. This condition is represented by line T. Immediately upon intersecting line M the temperature computing mechanism begins to take over the control of throttle valve 50 for limiting the fuel, which is accomplished by valves 200 and 234 and speed sensor 150 together with the compressor inlet pressure sensor 171.

The pressure established in line 176 is made proportional to compressor inlet pressure and is fed to line 256 to valve 200. Valve 200 which is responsive to compressor inlet temperature positions metering edge 250 metering fluid into line 258. By virtue of the area defined by metering edge 250 with respect to the cooperating port which area is a function of $\theta_2^x$ and the fixed restriction 260 a multiplication is effectuated so that the pressure in line 258 is made proportional to $P_2/\theta_2^x$. This pressure is then fed to valve 234 where metering edge 252 in conjunction with the cooperating port defines an area which varies as a function of $W_f \theta_2^x/P_2$. It will be appreciated that the position of this valve is varied as a function of $N_g^2/\theta_2$ which has been established by metering edge 251 of spool 226. It will be appreciated that pressure generated by pilot valve 161 is made proportional to $N_g^2$, which, in turn, is fed to line 142 and admitted to metering edge 251. By virtue of metering edge 251 and fixed restriction 253 a division is effectuated so that the pressure in line 255 is made proportional to $N^2/\theta_2$ which, in turn, acts on the left end of spool 240.

By virtue of the relationship of metering edge 252 and fixed restriction 262 another multiplication is effectuated so that the pressure in line 264 which, in turn is then admitted on the right end of spool 248 is made proportional to desired "$W_f$." This causes a hydraulic signal to be delivered through line 266 to act on the left end of spool 188 for causing it to shift and in turn alter the pressure in chamber 62. Owing to this pressure change, valve 50 is moved to a closing position for reducing the amount of fuel flow to maintain the limit defined by line M.

At the point where line M intersects line N the surge limit of the acceleration schedule will take over the control. This is effectuated by the mechanism enumerated in connection with the temperature limit except different metering edges are employed. Here the fluid pressure proportional to compressor discharge pressure is admitted to metering edge 224 via line 222. This metering edge in cooperation with the cooperating port defines an area which is a function of the $\sqrt{\theta_2}$. This metering edge together with fixed restriction 230 effectuates a multiplication for establishing a pressure in line 232 which is a function of $P_2\sqrt{\theta_2}$. This pressure in turn is fed to metering edge 238 which together with its cooperating port define an area which is a function of $$\frac{W_f}{P_2\sqrt{\theta_2}}$$

This area together with the area established by restrictor 242 effectuates still another multiplication for establishing the pressure in line 244 to be proportional to desired "$W_f$." This fluid is then admitted on the left end of spool 248 which, in turn, communicates a pressure signal to line 266 for adjusting the position of spool 188. This, in turn, causes the fluid in chamber 62 to be modified to position throttle valve in accordance with curve N.

At the point where curve N intersects once again line M the temperature control will once again take over in the same manner as described above.

When line M intersects droop line R the governor of the steady state operation will take control. The angle of the droop line is established by the component parts of the governor together with its attendant controlling mechanism.

From FIG. 4 it will be appreciated that fuel flow will be reduced until the control has established an operation condition indicated by the point S. This is the controlling point established by the computing mechanism of the fuel control.

What has been described is a fuel control that assures accurate fuel metering to assure optimum engine performance and assuring that malfunctions due to surge, overtemperature and rich and lean flameout do not ensue. The fuel control monitors preselected engine operating conditions and computes them to produce a signal ($W_f$) whose value is proportional to the desired fuel flow. The "$W_f$" signal is computed as a function of $$\frac{W_f \theta_2^x}{P_2} \text{ and } \frac{N_g^2}{\theta_2}$$

By virtue of this parameter, the heretofore customary three-dimensional cam has been eliminated which has led to the simplification of the fuel control resulting in a less complex and relatively less expensive control. Also, of relative importance is the fact that the temperature limit and the surge limit are each independently adjustable.

While this invention was illustrated utilizing a hydraulic type of computation system for a fuel control, it will be obvious to one skilled in the art that other mediums such as pneumatics or electronics and the like may suitably be adapted to practice this invention. What is significant and contemplated by the scope of this invention is the teaching of a new control parameter $$\frac{W_f \theta_2^x}{P_2} \text{ vs. } \frac{N_g^2}{\theta_2}$$

for controlling a gas turbine engine. To this end and referring now more specifically to FIG. 5, block 400 represenets a suitable speed sensing device receiving an input speed signal and converting it to a function of the square of the speed ($N^2$). This signal is then fed back into block 402 representing a divider which also received a second input signal $\theta_2$ responsive to the temperature at the inlet of the compressor. Here these two signals are divided to produce an output signal equal to a function of $N^2/\theta_2$. This signal then becomes the input signal to the function generator illustrated by block 404. It converts the signal to a value which is a function of $$\frac{W_f}{P_2\sqrt{\theta_2}}$$

This signal is then multiplied in the multiplication box represented by numeral 406 which multiplies this value by a signal equivalent to the function of $P_2\sqrt{\theta_2}$ which signal is established by block 408. Block 408 which represents a multiplication device receives a signal which is a function of compressor inlet pressure $P_2$ and $\sqrt{\theta_2}$ and multiplies these two signals to generate the $P_2\sqrt{\theta_2}$ signal. Block 406 multiplying these two values, then develops a $W_f$ signal which is proportional to the amount of fuel established by the computation mechanisms. This signal is then fed to a gate type of mechanism which senses another $W_f$ signal developed by block 412. Gate mechanism 400 sensing these two input signals delivers the lower value of the two to a second gate mechanism 414. Block 412 represents a multiplier which multiplies the two input signals $P_2/\theta_2^x$ and $W_f \theta_2^x/P_2$. The $W_f \theta_2^x/P_2$ signal is developed by function generator illustrated by block 416, as follows. Function generator 416 responding to the input signal $N^2/\theta_2$ developed by divider 402 modifies it to a value equal to a function of $W_f \theta_2^x/P_2$ which is then transmitted to multiplier 412. The second signal $P_2/\theta_2^x$ which is multiplied by multiplier 412 is generated by function generator 420 by combining two input signals $P_2$ and $\theta_2^x$ (generated by the function generator 422). The function generator 422 receives the input signal $\theta_2$. This signal received by function generator 422 in turn establishes the signal $\theta_2^x$ which is then combined with the $P_2$ signal in function generator 420 for producing the $P_2/\theta_2^x$. The multiplication taking place in the multiplier 412 develops the $W_f$ signal which is then transmitted to the gate mechanism 410. Gate mechanism 414 then compares the two $W_f$ signals and transmits the least value of the two to block 428 which represents the metering valve for delivering sufficient fuel to the engine in accordance with the valve determined by the computation system. The second $W_f$ signal fed into the gate mechanism 414 is developed by multiplier 430 which multiplies $P_2$ and $W_f/P_2$ (developed by function generator 432). Function generator 432 serves to combine a signal which is proportional to the power lever setting and a signal which is proportional to speed for producing the $W_f/P_2$ signal. This signal is then in turn transmitted to multiplier 430 which multiplies $P_2$ and $W_f/P_2$ for developing the $W_f$ signal.

From the foregoing, it is apparent that function generator 432 and multiplier 430 develop the scheduled steady state $W_f$ value for controlling the engine during the steady state operation. Multiplier 412, function generator 416, function generator 422, multiplier 420 serve to generate a $W_f$ signal which establishes the overtemperature limit for the acceleration schedule. Multipliers 408 and 406, function generator 404 served to generate a $W_f$ signal for limiting surge of the acceleration schedule.

For a clearer understanding of the mechanism represented by the various blocks in FIG. 5, a graphical illustration is shown therein to illustrate the desired function of each. For the sake of simplicity and convenience and because the graphical illustrations are obvious to one skilled in the art, a description of each is omitted from herein.

I claim:
1. The method of controlling a turbine type of power plant of the type having a burner and a compressor driven by a turbine comprising the steps of pressurizing fuel, metering the pressurized fuel to the burner as a single line function of

$$\frac{W_f \theta^x}{P}$$

relative to $$\frac{N}{\sqrt{\theta}}$$

so as to limit turbine temperature in a predetermined manner
where
  $W_f$=weight of fuel flow per unit of time
  $P$=pressure at the inlet of the compressor
  $\theta$=compressor inlet temperature
  $X$=a thermodynamic value of the power plant working medium
  $N$=rotational speed of the compressor 2. The method of controlling a turbine power plant of the type having a combustion section, and a compressor driven by a turbine comprising the steps of pressurizing fuel, metering the pressurized fuel to the combustion section and limiting the temperature of the power plant working fluid by limiting the flow of fuel mentioned in the step of metering in accordance with a predetermined schedule defined by the formula $$\frac{N}{\sqrt{\theta}}$$

which varies as a single line function of $$\frac{W_f \theta^x}{P}$$

so as to limit turbine inlet temperature in a predetermined manner
where
  $N$=rotational speed of the compressor
  $\theta$=compressor inlet temperature
  $W_f$=weight of fuel flow per unit of time
  $P$=pressure at inlet of the compressor
  $X$=a function of the thermodynamic characteristics of the power plant working medium 3. The method of controlling a turbine type power plant of the type having a combustion section, and a compressor subjected to surge driven by a turbine comprising the steps of
  pressurizing fuel,
  measuring power plant operating parameters including a pressure of the power plant working fluid, a temperature of the power plant working fluid and a rotational speed of a rotating power plant member,
  computing the power plant operating parameters measured in the step of measuring to establish a single line function of $$\frac{W_f \theta^x}{P}$$

relative to $$\frac{N}{\sqrt{\theta}}$$

so as to limit turbine inlet temperature in a predetermined manner
where
  $W_f$=weight of fuel flow per unit of time
  $\theta$=compressor inlet temperature
  $X$=a function of the thermodynamic characteristics of the power plant working medium
  $P$=compressor inlet pressure
  $N$=rotational speed of the compressor
metering the pressurized fuel to the combustion section in accordance to the relationship established in the step of computing, and
preselecting power output of said power plant by adjusting the relationship established in the step of computing as a function of a signal indicative of desired rotational speed of the power plant rotating member.

4. The method of controlling a turbine type of power plant of the type having a turbine, a burner and a compressor driven by the turbine comprising the steps of
pressurizing fuel,
metering the pressurized fuel to the burner, in accordance with a predetermined schedule which is a single line function of $$\frac{W_f \theta^x}{P}$$

relative to $$\frac{N}{\sqrt{\theta}}$$

so as to limit turbine inlet temperature in a predetermined manner
where
  $W_f$=weight of fuel flow per unit of time
  $P$=pressure at the inlet of the compressor
  $\theta$=compressor inlet temperature, and $$x = \frac{T_4}{\Delta T_b} - \frac{T_3}{\Delta T_b} \frac{K-1}{2K\eta}\left[\frac{1}{\frac{\partial W_a}{\frac{W_a}{\partial P}}+1}\right] - \frac{\frac{\partial W_a}{W_a}+\frac{1}{2}}{\frac{\partial W_a}{\frac{W_a}{\partial P}}+1}$$

$N$=rotational speed of the compressor
where
  $T_4$=turbine inlet temperature
  $\Delta T_b$=burner temperature rise
  $T_3$=compressor discharge temperature
  $K$=ratio of specific heat of the working medium
  $\eta$=compressor efficiency $\dfrac{\frac{\partial W_a}{W_a}}{\dfrac{\partial P}{P}}$=slope of the speed line of the compressor in a graph plotting the pressure ratio versus the air flow of the compressor.

5. The method of controlling a turbine type of power plant of the type having a turbine, a combustion section, a compressor driven by the turbine comprising the steps of
pressurizing fuel,
measuring power plant operating parameters of compressor inlet pressure, compressor inlet temperature and compressor rotational speed,
computing the parameters measured in the step of measuring to establish a single line function bearing the relationship of $$\frac{W_f \theta^x}{P}$$

to limit turbine inlet temperature in a predetermined manner
where
  $W_f$=weight of fuel flow per unit of time
  $\theta$=compressor inlet temperature
  $P$=compressor inlet pressure $$x = \frac{T_4}{\Delta T_b} - \frac{T_3}{\Delta T_b} \frac{K-1}{2K\eta}\left[\frac{1}{\frac{\partial W_a}{\frac{W_a}{\partial P}}+1}\right] - \frac{\frac{\partial W_a}{W_a}+\frac{1}{2}}{\frac{\partial W_a}{\frac{W_a}{\partial P}}+1}$$

where
  $T_4$=turbine inlet temperature
  $\Delta T_b$=burner temperature rise
  $T_3$=compressor discharge temperature
  $K$=ratio of specific heat of the working medium
  $\eta$=compressor efficiency $\dfrac{\frac{\partial W_a}{W_a}}{\dfrac{\partial P}{P}}$=slope of the speed line of the compressor in a graph plotting the pressure ratio versus the air flow of the compressor.

metering the pressurized fuel to the combustion section in accordance to the relationship established in the step of computing and
regulating the relationship established in the step of computing as a function of $$\frac{N}{\sqrt{\theta}}$$

where
  $N$=rotational speed of the compressor.

6. A fuel control for controlling a turbine type of power plant having a turbine, a combustion section, a compressor driven by said turbine, a source of fuel under pressure, connection means interconnecting said source and said combustion section,
  means for measuring compressor inlet pressure for producing a first signal,
  means for measuring compressor inlet temperature for producing a second signal,
  means for measuring compressor rotational speed for producing a third signal,
  means for combining said first, second and third signals to establish a single line function bearing the relationship of $$\frac{W_f \theta^x}{P}$$

to limit turbine inlet temperature in a predetermined manner
where
  $W_f$=weight of fuel flow per unit of time
  $\theta$=compressor inlet temperature
  $P$=compressor inlet pressure
  $x$=a function of a thermodynamic characteristic of the power plant working medium
and fuel regulating means in said connecting means responsive to said combining means.

7. A fuel control for controlling a turbine type of power plant having a turbine, a combustion section, a compressor driven by said turbine, a source of fuel under pressure, connection means interconnecting said source and said combustion section,
  means for measuring compressor inlet pressure for producing a first signal,
  means for measuring compressor inlet temperature for producing a second signal,
  means for measuring compressor rotational speed for producing a third signal,
  means for combining said first, second and third signals to establish a single line function bearing the relationship of $$\frac{W_f \theta^x}{P}$$

to limit turbine inlet temperature in a predetermined manner
where
    $W_f$=weight of fuel flow per unit of time
    $\theta$=compressor inlet temperature
    $P$=compressor inlet pressure $$x = \frac{T_4}{\Delta T_b} - \frac{T_3}{\Delta T_b} \frac{K-1}{2K\eta} \left[ \frac{1}{\frac{\frac{\partial W_a}{W_a}}{\frac{\partial P}{P}} + 1} \right] - \frac{\frac{\frac{\partial W_a}{W_a}}{\frac{\partial P}{P}} + \frac{1}{2}}{\frac{\frac{\partial W_a}{W_a}}{\frac{\partial P}{P}} + 1}$$

where
    $T_4$=turbine inlet temperature
    $\Delta T_b$=burner temperature rise
    $T_3$=compressor discharge temperature
    $K$=ratio of specific heat of the working medium
    $\eta$=compressor efficiency $\dfrac{\frac{\partial W_a}{W_a}}{\frac{\partial P}{P}}$=slope of the speed line of the compressor in a graph plotting the pressure ratio versus the flow of the compressor.

8. The method of controlling a turbine type of power plant of the type that has a turbine, a compressor driven by the turbine and a burner comprising the steps of metering fuel to the burner in accordance with a predetermined schedule defined by the formula $$\frac{W_f \theta^x}{P}$$

which is a single line function made relative to $$\frac{N}{\sqrt{\theta}}$$

where
    $W_f$=weight of fuel flow per unit of time
    $P$=compressor inlet pressure
    $\theta$=compressor inlet temperature, and $$x = \frac{T_4}{\Delta T_b} - \frac{T_3}{\Delta T_b} \frac{K-1}{2K} \left[ \frac{1}{\frac{\frac{\partial W_a}{W_a}}{\frac{\partial P}{P}} + 1} \right] - \frac{\frac{\frac{\partial W_a}{W_a}}{\frac{\partial P_a}{P}} + \frac{1}{2}}{\frac{\frac{\partial W_a}{W_a}}{\frac{\partial P}{P}} + 1}$$

$N$=rotational speed of the compressor
where
    $T_4$=turbine inlet temperature
    $\Delta T_b$=burner temperature rise
    $T_3$=compressor discharge temperature
    $K$=ratio of specific heat of the working medium
    $\eta$=compressor efficiency $\dfrac{\frac{\partial W_a}{W_a}}{\frac{\partial P}{P}}$=slope of the speed line of the compressor in a graph plotting the pressure ratio versus the air flow of the compressor.

computing a value of said formula by measuring the speed of the compressor, compressor inlet pressure and compressor inlet temperature, whereby said value is computed by
    combining the value of compressor inlet temperature with a function of the speed of the compressor for producing a first signal,
    generating a second signal as a function of the first signal whose relationship is defined by the formula $$\frac{W_f \theta^x}{P}$$

generating a third signal as a function of the first signal for establishing the relationship defined by a value of the expression $x$,
    combining the third signal with the value of compressor inlet temperature for producing a fourth signal,
    combining the fourth signal with the value of compressor inlet pressure for producing a fifth signal, and
    combining the fifth signal and the second signal.

References Cited by the Examiner
UNITED STATES PATENTS

| | | | |
|---|---|---|---|
| 2,668,416 | 2/1954 | Lee | 60—39.28 |
| 2,933,130 | 4/1960 | Wright et al. | 60—39.28 X |
| 2,954,669 | 10/1960 | Williams | 60—39.28 |
| 3,032,986 | 5/1962 | Wright | 60—39.28 |
| 3,076,312 | 2/1963 | Haigh | 60—39.28 |
| 3,098,356 | 7/1963 | Joline | 60—39.28 |
| 3,139,727 | 7/1964 | Torell | 60—39.28 |

JULIUS E. WEST, *Primary Examiner.*
MARK NEWMAN, *Examiner.*